(12) United States Patent
Foutch (10) Patent No.: US 12,129,986 B1
(45) Date of Patent: Oct. 29, 2024

(54) CLOSEOUT WITH FLEXIBLE LIGHT GUIDE FOR GAP LIGHTING

(71) Applicant: Valeo Vision, Bobigny (FR)

(72) Inventor: Cameron Foutch, Troy, MI (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/482,059

(22) Filed: Oct. 6, 2023

(51) Int. Cl.
*F21S 43/50* (2018.01)
*F21S 43/241* (2018.01)

(52) U.S. Cl.
CPC ............ *F21S 43/50* (2018.01); *F21S 43/241* (2018.01)

(58) Field of Classification Search
CPC ................................. F21S 43/50; F21S 43/241
See application file for complete search history.

(56) References Cited

U.S. PATENT DOCUMENTS

| | | | |
|---|---|---|---|
| 5,101,325 A | 3/1992 | Davenport et al. | |
| 6,305,813 B1 | 10/2001 | Lekson et al. | |
| 6,322,239 B1 | 11/2001 | Nitta et al. | |
| 6,508,563 B2 | 1/2003 | Parker et al. | |
| 9,033,561 B2 | 5/2015 | Tokieda et al. | |
| 10,215,360 B1* | 2/2019 | Grogan | F21S 43/315 |
| 10,495,282 B2* | 12/2019 | Ramos, II | F21S 43/19 |
| 10,534,221 B1 | 1/2020 | Zhu | |
| 11,754,251 B2* | 9/2023 | Nakamoto | F21S 43/40 362/221 |
| 11,772,546 B2* | 10/2023 | Darlage | B60Q 1/0041 362/549 |
| 2005/0171408 A1 | 8/2005 | Parker | |
| 2008/0264956 A1 | 10/2008 | Estlander | |
| 2013/0314935 A1* | 11/2013 | Tokieda | B60Q 1/0035 362/511 |
| 2014/0003075 A1 | 1/2014 | Yamada et al. | |
| 2015/0369445 A1 | 12/2015 | Orr et al. | |
| 2016/0138773 A1* | 5/2016 | Kawabata | F21S 43/249 362/511 |
| 2016/0208995 A1* | 7/2016 | Yoshino | B60Q 1/0041 |
| 2017/0122517 A1* | 5/2017 | Grammer | F21S 43/31 |
| 2018/0086028 A1 | 3/2018 | Berard et al. | |

FOREIGN PATENT DOCUMENTS

| | | |
|---|---|---|
| DE | 102012112075 A1 | 6/2014 |
| DE | 102016124110 A1 | 6/2017 |
| EP | 1835224 B1 | 6/2011 |
| JP | 2016012460 A | 1/2016 |

* cited by examiner

*Primary Examiner* — Bryon T Gyllstrom
(74) *Attorney, Agent, or Firm* — Young Basile Hanlon & MacFarlane, P.C.

(57) ABSTRACT

A light system of a vehicle includes a first light housing including a first light source configured to emit a first light from a face of the first light housing, a second light housing including a second light source configured to emit a second light from a face of the second light housing, a gap located between the first light housing and the second light housing, and a light guide within the gap, wherein the light guide is configured to transmit the first light from the first light housing to illuminate the gap with the first light.

20 Claims, 9 Drawing Sheets

CLOSEOUT WITH FLEXIBLE LIGHT GUIDE FOR GAP LIGHTING

TECHNICAL FIELD

This disclosure relates to a vehicle lighting system. Specifically, a vehicle lighting system where two light housings are separated by a gap. More specifically, where the gap is illuminated using a window or a flexible light guide.

BACKGROUND

Vehicles include many different types of lights. Some types of lights included on a vehicle are low beam headlights, high beam headlights, tail lights, turn signal lights, fog lights, running lights, or a combination thereof. Each of these lights extend out of an outer surface of a vehicle so that they provide light for the driver or provide notice to surrounding drivers. These lights may have gaps of darkness where lights are not present. Due to these gaps, the lights do not appear to be continuous. Thus, there is a need for a light system that provides light across the gap such that the light appears to be continuous.

SUMMARY

The present teachings provide a light system of a vehicle including a first light housing including a first light source configured to emit first light from a face of the first light housing, a second light housing including a second light source configured to emit second light from a face of the second light housing, a gap located between the first light housing and the second light housing, and an aperture within the first light housing, wherein gap light travels from the aperture into the gap to illuminate the gap.

The present teachings provide a light system of a vehicle including a first light housing comprising a first light source configured to emit first light from a face of the first light housing, a second light housing comprising a second light source configured to emit second light from a face of the second light housing, a gap located between the first light housing and the second light housing, wherein a gasket divides the gap into a first gap section and a second gap section, and a first aperture within the first light housing, wherein first gap light travels from the first aperture into the first gap section to illuminate the first gap section.

The present teachings provide a light system of a vehicle including a first light housing including a first light source configured to emit a first light from a face of the first light housing, a second light housing including a second light source configured to emit a second light from a face of the second light housing, a gap located between the first light housing and the second light housing, and a light guide within the gap, wherein the light guide is configured to transmit the first light from the first light housing to illuminate the gap with the first light.

The present teachings provide a light system of a vehicle including a first light housing including a light source, a second light housing, a gap located between the first light housing and the second light housing, and a light guide comprising a first surface configured to receive light from the light source and a second surface configured to project at least a portion of the light into the gap, wherein the first surface is within the first light housing and the second surface is within the gap.

The present teachings provide a light system of a vehicle including a first light housing including at least one light source configured to emit a first light from a first section of the first light housing and emit a second light from a second section of the first light housing, a second light housing including at least one light source configured to emit the first light from a first section of the second light housing and emit the second light from a second section of the second light housing, and a gap located between the first light housing and the second light housing. A first section of the gap is positioned between the first section of the first light housing and the first section of the second light housing, and a second section of the gap is positioned between the second section of the first light housing and the second section of the second light housing. The light system of the vehicle also includes a light guide within the gap configured to transmit light to illuminate the first section of the gap with the first light and the second section of the gap with the second light.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may comprise one or more or a plurality of light housings. A light housing may project light in a forward direction, rear direction, side direction, or a combination thereof. The light housing may project light from an external surface (e.g., a face) of the light housing. For example, if the light housing is forward facing, the light housing may project light from an external surface of the vehicle to a location in front of the vehicle or at an angle relative to the front of a vehicle. The light housing may direct some light at the ground. The light housing may direct some light above the ground. The light housing may be integrated into a front end, a rear end, or both of the vehicle. The light housing may project light out of the vehicle. The light housing may be multiple light housings stacked one above the other or integrated into a single light housing. The light of the vehicle may be two or more, three or more, or four or more light housings located one above another. The light housing may have a high beam and a low beam.

The light housing may include one or more light sources or a plurality of light sources. A total height of the light housing may be decreased by placing all of the light sources in a single plane or on a same plane. The light sources function to produce light. When more than one light source is present, each of the light sources may perform different function, provide different light, perform a same function, provide a same light, or a combination thereof. The light source may be a device or a plurality of devices that create light and the light extends outward from the light source. The light source may produce a high beam, a low beam, a blending beam, a running light, a daytime light, a turn signal, a brake light, or a combination thereof. The light source may be aimed for near light, far light, blending light that blends the far light and near light together, or a combination thereof. The light sources may have different functions. For example, one light source may provide a running light and another light source may be a turn signal or fog light. The light source may comprise a plurality of lights or may be a single light source within a set of light sources. The plurality of lights may be in one set or group of light sources. The light source may be a single light that projects light. In another example, a single light source may direct light to a first location (e.g., a light guide). The light source may be directional light. The light source may have an emission that is a Lambertian emission or a narrow emission angle. The directional light source may concentrate light on a light guide, towards a light bar, a reflector, or a combination thereof. The light source may include a laser diode, glowing phosphor, filament bulb, a light emitting diode, a halogenated light, a xenon light, or a combination thereof. The light source may create a cone of light with an optical axis. The optical axis may be directed at a light guide, a lens, a light pipe, a reflector, away from a vehicle, or a combination thereof.

The light source may be any type of lighting device that produces light such as an incandescent bulb, fluorescent light, compact fluorescent lamp, halogen lamp, light emitting diode (LED), high intensity discharge lamps (HID), halogen lights, xenon lights, a laser diode, phosphorous bulb, or a combination thereof. The light source may be a single lamp or bulb. Alternatively, the light source may be part of a set of light sources that includes a plurality of lamps, bulbs, diodes, or a combination thereof. The light source may be part of a set of light sources that includes two or more, 3 or more, 4 or more, or 5 or more light sources that produce light and combine together to form the light extending from the light system. The set of light sources may include 50 or less, 35 or less, 20 or less, or 15 or less devices that produce light (e.g., each set may include 5 light sources or alternatively all of the sets when combined together may include 5 light sources). For example, the set of light sources may be the contents of a single printed circuit board that perform a same lighting function and the set of light sources may be 5 light sources. The set of light sources may be all of the light sources on all of the printed circuit boards that create a same lighting function and may be 15 light sources. For example, there may be 30 total light sources, but only 15 perform a same function and those may be a set of light sources. The light source may be static. In some embodiments, a single light source will be directed at a single reflector, lens, light guide, light pipe, or a combination thereof. The light source may be free of movement. The light source may be fixed or may be fixed relative to a reflector or a reflector housing. The light source may be static and may be manually or physically adjusted so that the light source is directed to a desired location. Adjusting a reflector housing may adjust the light source. The light source may be fixed and the light from the light source may be moved, bent, directed, or a combination thereof by optical elements or reflectors (e.g., a light guide). Each device of the light source may be turned on and off. The light source may be located within a light system at a location relative to a light guide. Each light guide may receive light from a single light source. The light sources may work together as a set of light sources to create light. The light source may create lighting that is visible at a location outside of a vehicle.

The lighting may function to provide an alert around a vehicle. The lighting may function to alert individuals, autonomous systems, or both as to activities of a vehicle. The lighting may be the light projected outward from the light sources. The lighting may illustrate that a turn is coming or anticipated. The lighting may illustrate that a braking function is being performed, a vehicle is slowing, or both. The lighting may include a first portion on a first light housing and a second portion on a second light housing. The lighting may include a first portion on a first part of a vehicle and a second portion on a second part of a vehicle. The first portion and the second portion may be spaced apart, movable relative to one another, or both. The lighting may have a break or gap such that the lighting does not appear continuous.

The gap may be a physical space between two light housings, between two light sources, between lighting from two or more light sources, or the like or a combination or sub-combination thereof. The gap may be an appearance of non-continuous lighting. The gap may be a physical separation between a first light housing and a second light housing. The gap may be formed between a door and a panel, a trunk and a body portion, a hood and a body portion, a tailgate and a body portion, or a combination thereof so that a portion of the vehicle (e.g., tailgate, hood, trunk, or door) are movable relative to the remainder of the vehicle. The gap may physically separate two or more parts of a vehicle so that one part is movable relative to the other parts. Alternatively, the gap may physically separate two or more parts of a vehicle that are fixed relative to each other. The lighting may include one or more gap light sources or gap lighting that project light across the gap, over the gap, into the gap, out of the gap, through the gap, or a combination thereof. The gap light source may be a diffusive gap light source configured to diffuse light within the gap. Alternatively, the gap light source may be an angled gap light source configured to direct light out of the gap.

The gap lighting functions to obscure the gap such that the gap is not visible. The gap lighting may be a portion of the lighting that is directed at an angle relative to the vehicle and lighting such that the gap is obscured by the gap lighting. The gap lighting may extend at an angle that is not orthogonal to the light source, the vehicle, surrounding lighting, or a combination thereof. For example, the lighting may extend substantially orthogonal to the vehicle, light source, or both and the gap lighting may extend at an angle relative to the lighting. The angle of the gap lighting relative to the lighting may be about 5 degrees or more, about 15 degrees or more, about 30 degrees or more, or about 45 degrees or more. The gap lighting may extend at an angle relative to the lighting of about 90 degrees or less, about 75 degrees or less, or about 60 degrees or less. The gap lighting may extend at any angle such that the gap is obscured by the gap lighting, the gap lighting and the lighting provide an appearance that the light is continuous, or both. Multiple different gap light sources may be present. When multiple gap light sources are present, they may be different colored lights. When multiple gap light sources are present, they all may be on, some may be on and some may be off, one may be on, one may be off, or a combination thereof. In some embodiments, when one gap light source turns on another gap light source turns off. The gap lighting may project out of a portion of the light housing that is different than the lighting, may project from a side of the light housing, or both.

The light housing functions to connect all or a portion of the light system to the vehicle or within the vehicle. The light housing may contain all or a portion of a light, a light source, a reflector, a light pipe, a light guide, a lens, or a combination thereof. The light housing may form an outer portion of a lighting system, a portion of a lighting system that connects to the vehicle, a portion of a lighting system that extends into the vehicle, or a combination thereof. The light housing may entirely be located within a single component of the vehicle. For example, each light housing may be located within a single component and two adjacent light housings may be spaced apart by the gap. The gap may physically separate two light housings. The light housing may house the light sources. The light housing may assist in projecting the light or aiming the light. The light housing may protect the light system. The light housing may include one or more portions.

The one or more portions of the light housing may be separate pieces connected to the vehicle to make up one lighting system. The one or more portions may be discrete pieces that are free of any direct connection. The one or more portions may be located on or connected to discrete pieces of the vehicle. The two or more portions may be spaced apart by the gap. The light housing may house and/or support one or more reflectors.

The one or more reflectors may function to reflect light outward to provide the lighting. The one or more reflectors may be one or more reflective materials (e.g., a reflective paint, a paint with a reflective additive, or the like), one or more reflective stickers (e.g., reflective tape), one or more polymeric reflectors (e.g., a retroreflector), one or more optics (e.g., a lens, a micro optic, a prism, or the like), one or more mirrors, or the like, or some other light redirecting material or a combination or sub-combination thereof. The one or more reflectors may provide indirect light. The one or more reflectors may aim the light. The one or more reflectors may provide a running light, a high beam, a low beam, a turn signal, a brake light, or a combination thereof. The one or more reflectors may be located within the light housing. The one or more reflectors may be located inside of the light housing and in front of an interior housing. The one or more reflectors may hide the interior housing from view. The one or more reflectors may extend on an outward side of the interior housing and be connected to the internal housing. The reflector may be a reflective surface on an exterior surface of the interior housing.

The light housing may have one or more through holes or openings (i.e., an aperture) in the exterior surface of the light housing. The one or more through holes or openings function to permit light to exit the light housing. The one or more through holes or openings may be located proximate to the gap, in a direction of the gap, or both. The one or more through holes may receive or be connected to a patch, a light pipe, a lens, a light guide, a window, a reflector, or a combination thereof. The one or more through holes may extend in a direction that is different than the lighting, or an opening in the light housing. The one or more through holes may allow light to extend outward from the light housing. The one or more though holes may include a window, a lens, a transparent piece (i.e., a patch), or a combination or sub-combination thereof that permits light to exit the housing. The one or more through holes may allow light to exit in a direction other than a forward direction, opening of the light system, opening in the light housing, or a combination thereof. The light housing, the lenses, the transparent piece, or a combination thereof may be free of any through holes or openings. The one or more through holes may function as a vent for the light housing.

The light housing may have one or more light sources in the exterior surface of the light housing. The light source may be within the one or more through holes or openings. For example, the one or more through holes or openings may surround a light source such that the light source is within the exterior surface of the light housing.

The light guide functions to direct light from a first location to a second location. The light guide may be flexible. The light guide may be made from an elastomeric material. The light guide may be in contact or communication with a light source at an entrance face (i.e., a first end) and project light from an exit face (i.e., a second end). The exit face of the light guide may be within the gap. The exit face of the light guide may substantially fill the gap or fill a portion of the gap. The exit face of the light guide may be recessed within the gap. The exit face of the light guide may be flush with a surface of the light housing (e.g., the face of the light housing). The light guide may be curved between the entrance face and the exit face (i.e., a normal vector corresponding to the entrance face extends noncollinearly with respect to a normal vector corresponding to the exit face).

The light guide may transport light from the light source into the gap. The light guide may be a lens that passes light into the gap. The light guide may be light pipe. The light guide may be a substantially planar component. The light guide may be a tube. The light guide may be a fiber optic cable. The light guide may have a length of about 2 mm or more, 5 mm or more, 1 cm or more, 3 cm or more, 5 cm or more, 10 cm or more, or 20 cm or more. The light guide may have a length of about 50 cm or less, about 35 cm or less, or about 25 cm or less. The light guide may extend a length of a light housing. The light guide may extend a partial length of a light housing. The light guide may be connected within or supported along all or a portion of the gap by a support.

The support functions to align the light guide with a light source, an opening, a through hole, the gap, or a combination thereof. The support may fixedly connect the light guide to the light housing, the gap, the reflector, or a combination thereof. The support may hold the light guide in place. The support may maintain alignment of the light guide to a light source, an opening, a through hole, or a combination thereof. The support may be a clip, a two-sided tape, an adhesive, a metal fastener, a plastic fastener, a fastener that is complementary in shape to the light guide, complementary in shape to the gap, or a combination thereof.

Figures 1, 2:
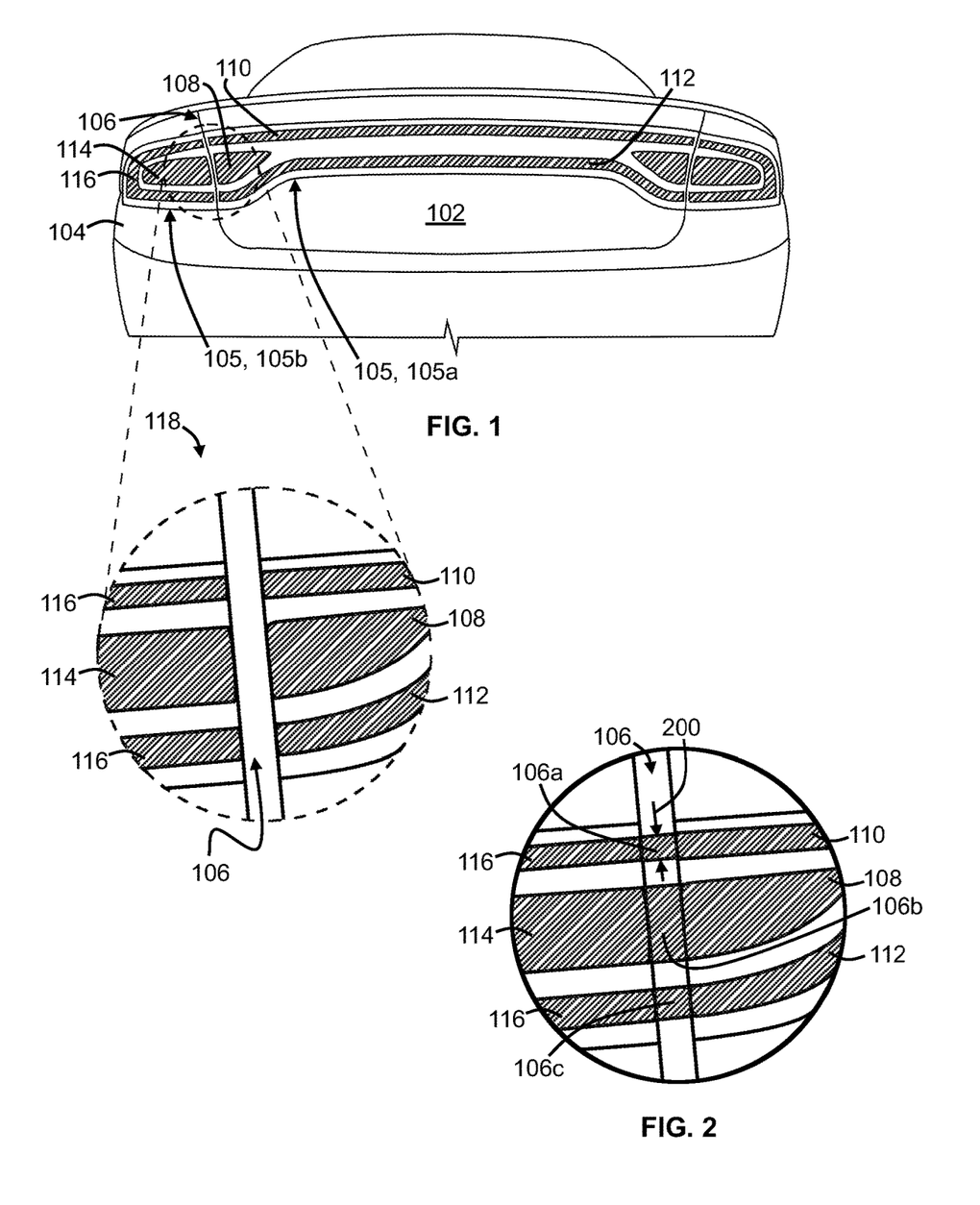
FIG. 1 is a rear view of a vehicle including a zoomed portion illustrating a gap between two vehicle light housings when the gap is not illuminated.
FIG. 2 is the zoomed portion of FIG. 1 illustrating the gap between two vehicle light housings when the gap is illuminated.

Referring to FIGS. 1 and 2, an example of a vehicle 100 with the light system installed is shown. A trunk 102 and a body portion 104 of the vehicle 100 are divided by the gap 106.

The trunk 102 supports the first light housing 105*a*. The first light housing 105*a* projects light from sections on the face of the first light housing 105*a*. For example, in FIG. 1, the first light housing 105*a* projects light from a first section 108, a first light bar 110, and a second light bar 112. The first light bar 110 and the second light bar 112 may emit light within a path along the face of the first light housing 105*a*.

The body portion 104 supports the second light housing 105*b*. The second light housing 105*b* projects light from sections on the face of the second light housing 105*b*. For example, in FIG. 1, the second light housing 105*b* projects light from a second section 114 and a third light bar 116. The third light bar 116 may emit light within a path along the face of the second light housing 105*b*.

The gap 106 divides the first light housing 105*a* and the second light housing 105*b*. In FIG. 1, the zoomed portion 118 depicts the gap 106 when the light system is not active. FIG. 2 depicts the zoomed portion 118 when the light system is active.

A first gap section 106*a* of the gap 106 may be between the first light bar 110 and the third light bar 116. A second gap section 106*b* of the gap 106 may be between the first section 108 and the second section 114. A third gap section 106*c* of the gap 106 may be between the second light bar 112 and the third light bar 116. When the light system is active, the gap 106 may be illuminated. For example, the first gap section 106*a*, the second gap section 106*b*, the third gap section 106*c*, or any combination or sub-combination thereof, may be illuminated.

Illuminating the gap 106 may obscure interruption in the light. For example, when the first gap section 106*a* is illuminated, the first light bar 110 and the third light bar 116 may appear to emit light within the same continuous path across the gap 106. For example, when the second gap section 106*b* is illuminated, the first section 108 and the second section 114 may appear to emit light from a singular light section. In another example, when the third gap section 106*c* is illuminated, the second light bar 112 and the third light bar 116 may appear to emit light within the same continuous path across the gap 106.

The first light section 106*a* may be illuminated to visually correspond to the first light bar 110, the third light bar 116, or both. The first light section 106*a* may be illuminated to a corresponding color, temperature, intensity, luminance, brightness, wavelength, or the like. For example, if the first light bar 110 and the third light bar 116 are illuminated with a same or similar light, the first light section 106*a* may be illuminated with the same or similar light. Alternatively, if the first light bar 110 and the third light bar 116 are illuminated with different light, the first light section 106*a* may be illuminated with a light that is between the light illuminating the first light bar 110 and the light illuminating the third light bar 116 (e.g., a light that is brighter than the first light bar 110 and duller than the third light bar 116).

A dimension 200 (e.g., a height or thickness) of the first gap section 106*a* may be approximately equal to, match, or fit a corresponding dimension of a section of the face of the light housing 105 configured to illuminate adjacent the gap 106 (e.g., a corresponding dimension of the first light bar 110 adjacent to the gap 106, a corresponding dimension of the third light bar 116 adjacent to the gap 106, or both). Accordingly, the first gap section 106*a* may provide an appropriate visual bridge (e.g., smooth, continuous, progressive, uniform, or the like) between the first light bar 110 and the third light bar 116. A corresponding dimension of the second gap section 106*b*, the third gap section 106*c*, and the like may similarly match, fit, or bridge sections of the face of the first light housing 105*a*, the second light housing 105*b*, or both, adjacent the gap 106.

Figure 3:
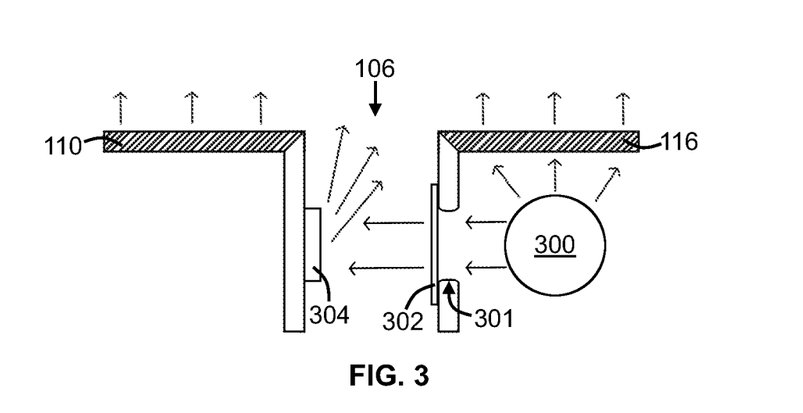
FIG. 3 is a schematic view of the gap illuminated using a patch on a light housing.

Referring to FIG. 3, a schematic view of the gap 106 is shown. The schematic view depicts a portion of the gap 106 between the first light bar 110 and the third light bar 116. The first light housing 105*a* is shown on the left side and the second light housing 105*b* is shown on the right side. A light source 300 may be used to illuminate the gap 106. Unlabeled arrows are used to illustrate emission of light in a direction of the unlabeled arrows.

The light source 300 may be a light source within the first light housing 105*a* or the second light housing 105*b*. In some embodiments, the light source 300 may be used to both illuminate the gap 106 and to emit light from the face of the light housing 105, for example, to emit light from the third light bar 116. In other embodiments, the light source 300 may be used to substantially exclusively illuminate the gap 106.

Light from the light source 300 may exit the light housing 105 through the aperture 301 covered by the patch 302. The patch 302 may be made from a transparent material. For example, in selected embodiments, the patch 302 may be a transparent silicon patch. The patch 302 may substantially seal around the aperture 301 to prevent airflow. Alternatively, the patch 302 may function as a vent. In this embodiment, the light source 300 may function as the gap light source.

Light from the light source 300 may be reflected by the reflector 304. The reflector 304 may be located within the gap 106. The reflector 304 (e.g., reflective tape, polymeric reflector, optic, mirror, or some other light reflecting material) may function to reflect light out of the gap 106. The reflector 304 may be located on an exterior surface of the light housing 105. The reflector 304 may be positioned to receive light from the light housing 105. In some embodiments, the reflector 304 may be located on an exterior surface of the first light housing 105*a* and positioned to receive light from the second light housing 105*b*. In other embodiments, the reflector 304 may be located on an exterior surface of the second light housing 105*b* and positioned to receive light from the first light housing 105*a*. The reflector may be integrated into the light housing 105, embedded into the light housing 105, applied to the light housing 105, or the like. In some embodiments, the reflector 304 may be omitted.

Figure 4:
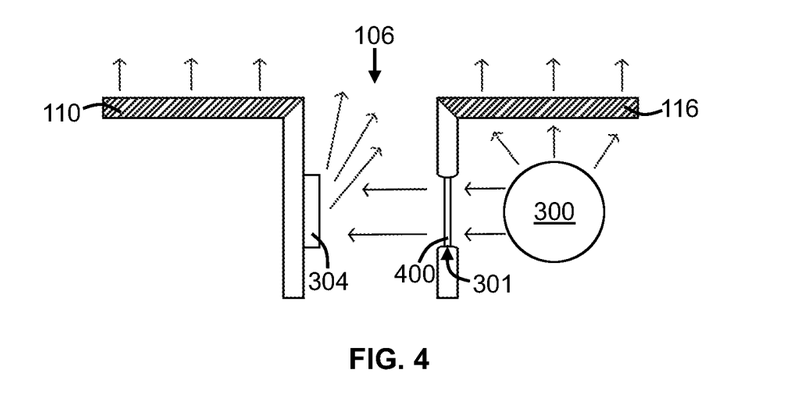
FIG. 4 is a schematic view of the gap illuminated using a window in a light housing.

Referring to FIG. 4, a schematic view of the gap 106 is shown. Similar to FIG. 3, the schematic view depicts a portion of the gap 106 between the first light bar 110 and the third light bar 116. The aperture 301 may include a window 400. The window 400 may be embedded within the exterior surface of the light housing 105. In this embodiment, the light source 300 may function as the gap light source.

The window 400 may allow light from the light source 300 to illuminate the gap 106. The window 400 may be angled such that light passing through the window is projected out of the gap 106. The window 400 may be angled such that light passing through the window 400 is projected towards the reflector 304. In some embodiments, the reflector 304 may be omitted.

The window 400 may be a lens. The window 400 may cause light to diffuse, scatter, focus, or the like. The window 400 may direct light that passes through. The window 400 may be sealed within the aperture 301, preventing the flow of air. Alternatively, the window 400 may function as a vent for the light housing 105. The window 400 may be polarized.

Figure 5:
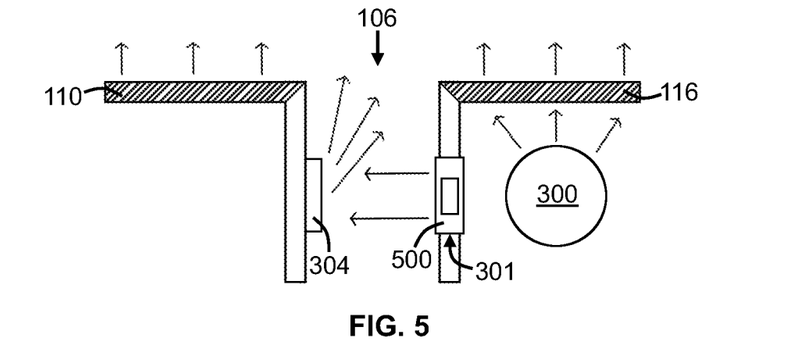
FIG. 5 is a schematic view of the gap illuminated using a gap light source.

Referring to FIG. 5, a schematic view of the gap 106 is shown. Similar to FIG. 3, the schematic view depicts a portion of the gap 106 between the first light bar 110 and the third light bar 116. The aperture 301 may include a gap light source 500. The gap light source 500 may be a light source configured to substantially exclusively illuminate the gap 106. The light source 300 may be a first light source and the gap light source 500 may be a second light source. Alternatively, there may be multiple light sources 300 (e.g., a first light source and a second light source) and the gap light source 500 may be an additional light source (e.g., a third light source). The gap light source 500 may comprise one or more light sources to produce light.

The gap light source 500 may fill the aperture 301. The gap light source 500 may be sealed within the aperture 301, substantially preventing the flow of air. Alternatively, the gap light source 500 may function as a vent for the light housing 105. The gap light source 500 may be positioned to project light towards the reflector 304. In some embodiments, the reflector 304 may be omitted.

Figure 6:
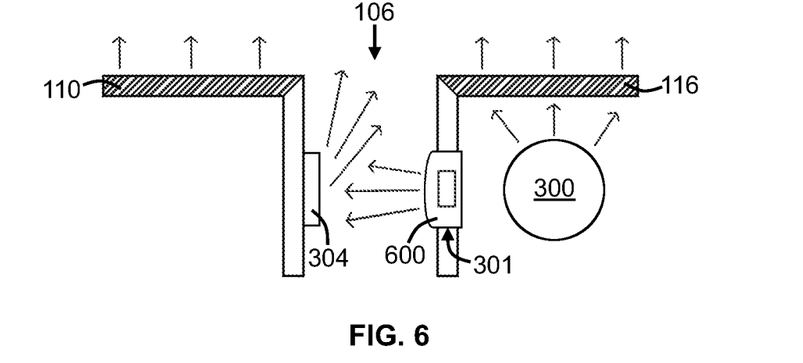
FIG. 6 is a schematic view of the gap illuminated using a diffusive gap light source.

Referring to FIG. 6, a schematic view of the gap 106 is shown. Similar to FIG. 3, the schematic view depicts a portion of the gap 106 between the first light bar 110 and the third light bar 116. The aperture 301 may include a diffusive gap light source 600. The diffusive gap light source 600 may comprise one or more light sources to produce light. The diffusive gap light source 600 may be a gap light source 500 configured to diffuse emitted light. The diffusive gap light source 600 may scatter light within the gap 106.

Figure 7:
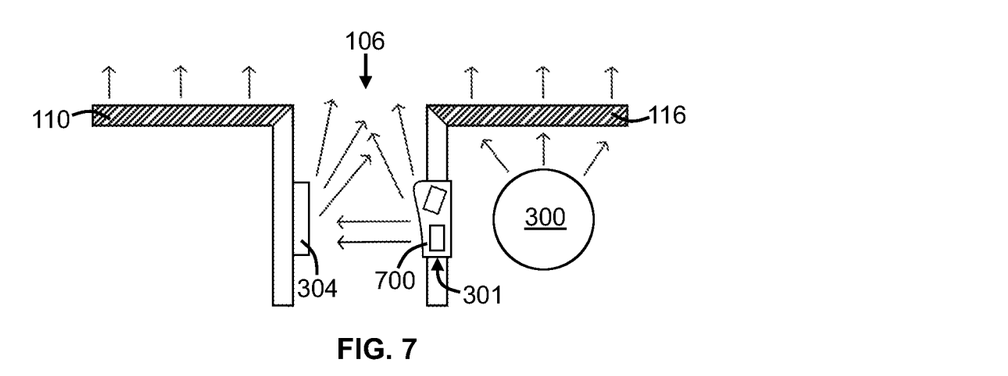
FIG. 7 is a schematic view of the gap illuminated using an angled gap light source.

Referring to FIG. 7, a schematic view of the gap 106 is shown. Similar to FIG. 3, the schematic view depicts a portion of the gap 106 between the first light bar 110 and the third light bar 116. The aperture 301 may include an angled gap light source 700. The angled gap light source 700 may comprise one or more light sources to produce light. The angled gap light source 700 may be a gap light source 500 configured to emit light out of the gap 106. The angled gap light source 700 may direct light out of the gap 106. In some embodiments, the angled gap light source 700 may also direct light within the gap 106.

Figure 8:
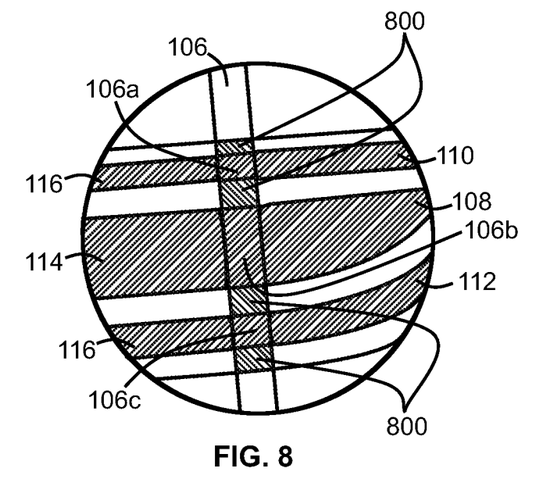
FIG. 8 is the view of FIG. 2 with gaskets dividing the gap when the gap is illuminated.

Referring to FIG. 8, the view of FIG. 2 is shown including gaskets 800 within the gap 106. FIG. 8 depicts the gap 106 with four gaskets 800, but embodiments may include more than four gaskets 800 or less than four gaskets 800. The gaskets 800 may be used to inhibit the flow of light within the gap 106. For example, the gaskets 800 may separate the light from different gap light sources. The gaskets 800 may be attached to the vehicle 100 within the gap 106. For example, the gaskets 800 may be attached to the first light housing 105a, the second light housing 105b, the trunk 102, the body portion 104, or elsewhere on the vehicle 100. In some embodiments, two gaskets 800 may be placed within the gap 106 such that the distance between the two gaskets 800 corresponds to a distance along the edge of a section that projects light from the face of the first light housing 105a, the second light housing 105b, or both. The gaskets 800 may limit the light that escapes from a continuous path formed by the first light bar 110 and the third light bar 116, the second light bar 112 and the third light bar 116, or both.

The gaskets 800 may be made from a foam material, a rubber material, a plastic, or the like. The gaskets 800 may be formed such that the gaskets 800 may absorb impacts caused by moving pieces of the vehicle 100, for example closing the trunk 102.

Figure 9:
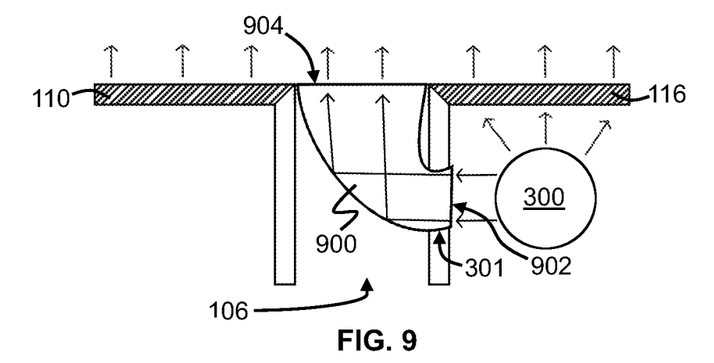
FIG. 9 is a schematic view of the gap illuminated using a flexible light guide.

Referring to FIG. 9, a schematic view of the gap 106 is shown. The schematic view depicts a portion of the gap 106 between the first light bar 110 and the third light bar 116. The first light housing 105a is shown on the left side and the second light housing 105b is shown on the right side. The light guide 900 may be used to illuminate the gap 106. The light guide 900 may receive light from the light source 300 in the entrance face 902 (i.e., the first end) and project the light from the exit face 904 (i.e., the second end). The light source 300 may be positioned such that substantially all of the light from the light source 300 is received by the light guide 900. Alternatively, only a portion of the light from the light source 300 may be received by the light guide 900.

The light guide 900 may be positioned to transmit the light out of the gap 106. The entrance face 902 of the light guide 900 may be positioned within the aperture 301 of the first light housing 105a. Alternatively, the entrance face 902 of the light guide 900 may be positioned within the interior of the first light housing 105a. The exit face 904 of the light guide 900 may substantially fill a width of the gap (i.e., the distance between the first light housing 105a and the second light housing 105b). The exit face 904 of the light guide 900 may be positioned to be substantially flush with a surface of the light housing 105 (e.g., the face of the light housing 105). For example, the exit face 904 of the light guide 900 may be positioned within 0.1 mm or less, within 1 mm or less, within 3 mm or less, or within 5 mm or less of the face of the light housing 105. The light guide 900 may be flexible. The light guide 900 may be positioned to not interfere with movement of parts of the vehicle 100, for example rotating hinged parts of the vehicle from an open position to a closed position (i.e., closing the trunk 102). Alternatively, the light guide 900 may be made from an impact resistant material and may absorb impacts caused by moving pieces of the vehicle 100, for example closing the trunk 102.

Figure 10:
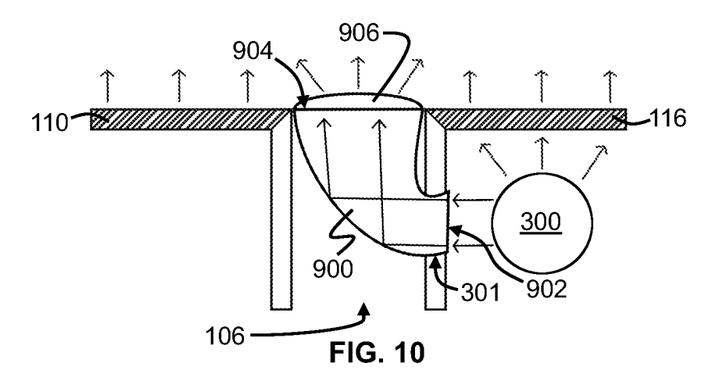
FIG. 10 is a schematic view of the gap illuminated using a flexible light guide with a diffusive layer.

Referring to FIG. 10, a schematic view of the gap 106 is shown. Similar to FIG. 9, the schematic view depicts a portion of the gap 106 between the first light bar 110 and the third light bar 116. The light guide 900 may include a diffusive layer 906. The diffusive layer 906 may be attached to the exit face 904 of the light guide 900. The diffusive layer 906 may be positioned to receive light from the light guide 900. The diffusive layer 906 may diffuse or scatter the light from the light guide 900. The diffusive layer 906 may project the light spherically. The diffusive layer 906 may be within the gap 106. The diffusive layer may substantially fill the gap 106 or a portion of the gap 106. The diffusive layer 906 may be recessed within the gap 106. The diffusive layer 906 may be substantially flush with a surface of the light housing 105 (e.g., the face of the light housing 105). The diffusive layer 906 may direct the light out of the gap 106. The diffusive layer 906 may direct the light away from the vehicle 100.

Figure 11:
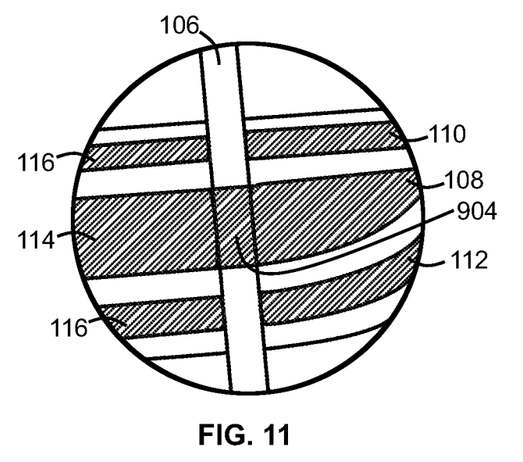
FIG. 11 is the view of FIG. 2 with the gap illuminated using a flexible light guide.

Referring to FIG. 11, the view of FIG. 2 is shown with the gap 106 illuminated using the light guide 900. FIG. 11 shows the exit face 904 of the light guide 900 filling a section of the gap 106 between the first section 108 and the second section 114. When the light guide 900 projects light from the exit face 904, the first section 108 and the second section 114 may appear to emit light from a singular light section. The exit face 904 of the light guide 900 is placed between the first section 108 and the second section 114 as an example. In certain embodiments, the exit face 904 of the light guide 900 may be placed between the first light bar 110 and the third light bar 116 or the second light bar 112 and the third light bar 116. Alternatively, the exit face 904 of multiple light guides 900 may each be placed between the first section 108 and the second section 114, the first light bar 110 and the third light bar 116, the second light bar 112 and the third light bar 116, or any combination or sub-combination thereof.

Figure 12:
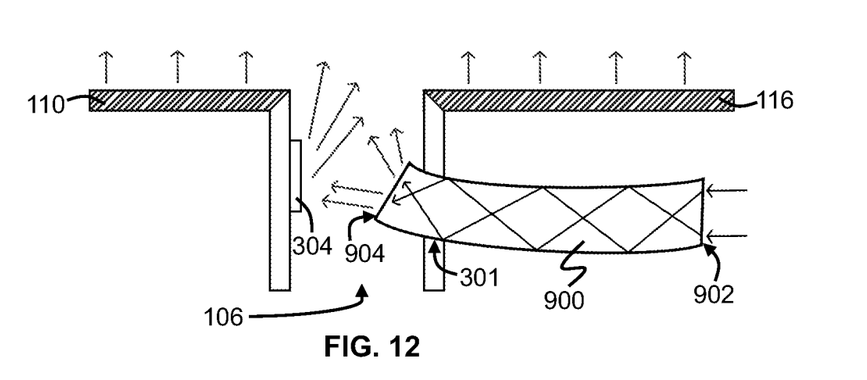
FIG. 12 is a schematic view of the gap illuminated using a flexible light guide recessed in the gap.

Referring to FIG. 12, a schematic view of the gap 106 is shown. Similar to FIG. 9, the schematic view depicts a portion of the gap 106 between the first light bar 110 and the third light bar 116. The light guide 900 may transmit light across a distance within the light housing 105. For example, the light guide 900 may receive light from a light source within the first light housing 105a located further within the first light housing 105a. Alternatively, the light guide 900 may receive light from another area of the vehicle 100.

The light guide 900 may be recessed within the gap 106. The reflector 304 may be positioned to receive light projected by the light guide 900. In some embodiments, the reflector 304 may be omitted.

Figure 13:
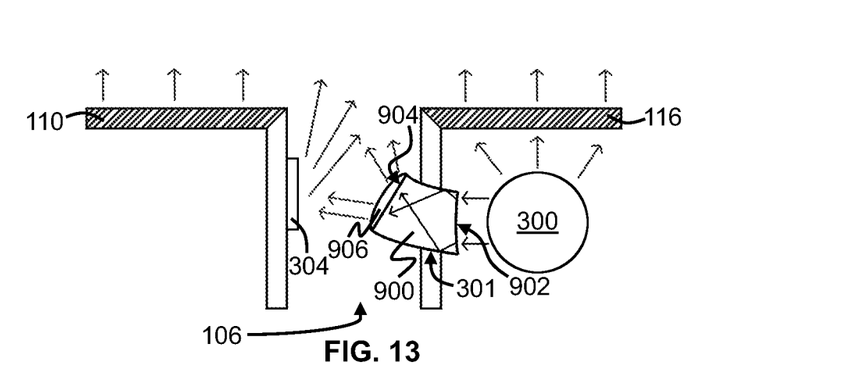
FIG. 13 is a schematic view of the gap illuminated using a flexible light guide with a diffusive layer recessed in the gap.

Referring to FIG. 13, a schematic view of the gap 106 is shown. Similar to FIG. 9, the schematic view depicts a portion of the gap 106 between the first light bar 110 and the third light bar 116. The light guide 900 may be recessed within the gap 106 and include the diffusive layer 906. The reflector 304 may be positioned to receive light diffused by the diffusive layer 906. In some embodiments, the reflector 304 may be omitted.

Figure 14:
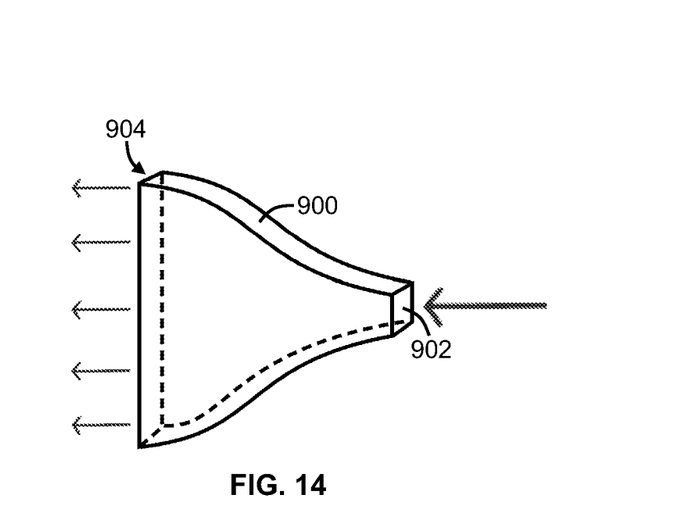
FIG. 14 is a side view of an expanding light guide.

Referring to FIG. 14, the light guide 900 may expand between the entrance face 902 and the exit face 904 (i.e., a surface area of the entrance face 902 of the light guide 900 may be smaller than a surface area of the exit face 904 of the light guide 900). The entrance face 902 of the light guide 900 is shown on the right, and the exit face 904 of the light guide 900 is shown on the left. The light guide 900 may receive light of a greater intensity in the entrance face 902 and project the light with a lesser intensity from the exit face 904. The exit face 904 of the light guide 900 may be sized to fill the gap 106 or a portion of the gap 106.

In other embodiments, the light guide 900 may contract between the entrance face 902 and the exit face 904 (i.e., a surface area of the entrance face 902 of the light guide 900 may be larger than a surface area or the exit face 904 of the light guide 900). Accordingly, the light guide 900 may receive light of a lesser intensity in the entrance face 902 and project the light with a greater intensity from the exit face 904. The exit face 904 of the light guide 900 may be sized to fill the gap 106 or a portion of the gap 106.

Figure 15:
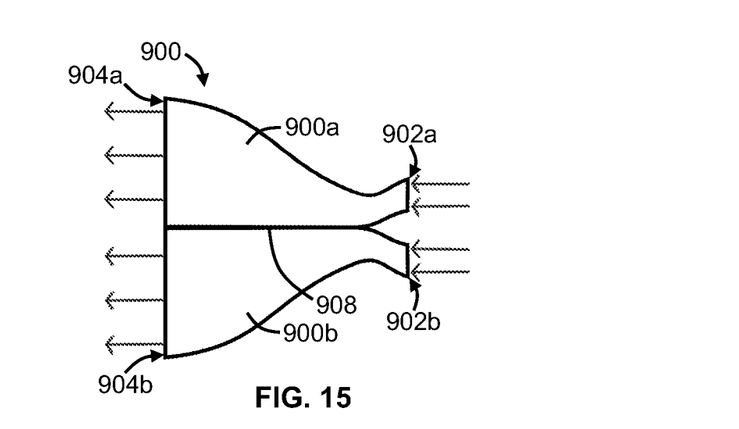
FIG. 15 is a side view of a split light guide divided by a light blocker.

Referring to FIG. 15, the light guide 900 may be split into a first light guide 900a and a second light guide 900b. The light guide 900 is shown divided into two pieces but may be divided into more than two pieces. In some embodiments, the first light guide 900a and the second light guide 900b may be pieces of a single light guide 900. In other embodiments, the first light guide 900a and the second light guide 900b may be separate light guides positioned proximate each other.

The first light guide 900a and the second light guide 900b may be divided by a light blocker 908. The light blocker 908 may prevent transmission of light between the first light guide 900a and the second light guide 900b. In some embodiments, the first light guide 900a and the second light guide 900b may receive light from different light sources. In other embodiments, the first light guide 900a and the second light guide 900b may receive light from the same light source.

The exit face 904a of the first light guide 900a may be positioned proximate the exit face 904b of the second light guide 900b within the gap 106. This arrangement may provide a continuous appearance of light within the gap, even if the light projected by the first light guide 900a is different from the light projected by the second light guide 900b (e.g., a different color of light). Alternatively, the exit face 904a of the first light guide 900a and the exit face 904b of the second light guide 900b may be spaced apart from each other.

Figure 16:
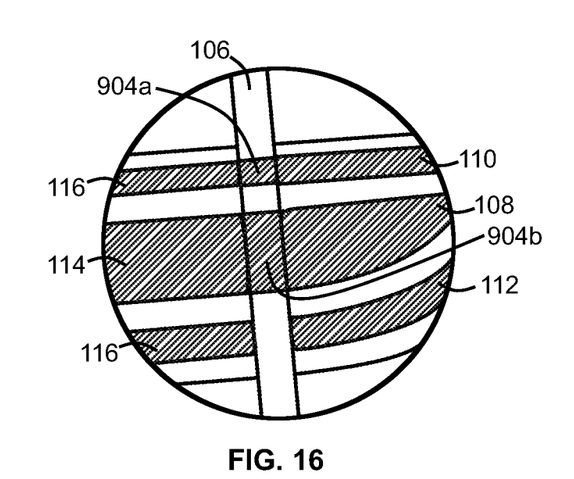
FIG. 16 is the view of FIG. 2 with the gap illuminated using a split light guide.

Referring to FIG. 16, the view of FIG. 2 is shown with the gap 106 illuminated using the first light guide 900a and the second light guide 900b. FIG. 16 shows the exit face 904a of the light guide 900a filling a section of the gap 106 between the first light bar 110 and the third light bar 116 and the exit face 904b of the light guide 900b filling a section of the gap 106 between the first section 108 and the second section 114. When the light guide 900a projects light from the exit face 904a, the first light bar 110 and the third light bar 116 may appear to emit light within the same continuous path across the gap 106. When the light guide 900b projects light from the exit face 904b, the first section 108 and the second section 114 may appear to emit light from a singular light section.

The exit face 904a of the light guide 900a placed between the first light bar 110 and the third light bar 116 and the exit face 904b of the light guide 900b placed between the first section 108 and the second section 114 are shown as an example. In certain embodiments, the exit face 904a of the light guide 900a may be placed between the first section 108 and the second section 114 or the second light bar 112 and the third light bar 116. In other embodiments, the exit face 904b of the light guide 900b may be placed between the first light bar 110 and the third light bar 116 or the second light bar 112 and the third light bar 116. Alternatively, in embodiments where the light guide 900 is divided into more than two pieces, the exit face 904 may be positioned between the first section 108 and the second section 114, the first light bar 110 and the third light bar 116, the second light bar 112 and the third light bar 116, or any combination or sub-combination thereof.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification.

For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30," inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A light system of a vehicle, comprising:
   a first light housing including a first light source configured to emit a first light from a face of the first light housing;
   a second light housing including a second light source configured to emit a second light from a face of the second light housing;
   a gap located between the first light housing and the second light housing; and
   a light guide within the gap and positioned to fill at least a portion of the gap, wherein the light guide is configured to transmit the first light from the first light housing to illuminate the gap with the first light.

2. The light system of claim 1, wherein the light guide comprises elastomeric material.

3. The light system of claim 1, wherein an end surface of the light guide within the gap is substantially flush with the face of the first light housing.

4. The light system of claim 1, wherein the light guide comprises a diffusive layer configured to scatter the first light.

5. The light system of claim 1, wherein the light guide is configured to receive the first light from the first light source.

6. The light system of claim 1, wherein the light guide is configured to receive the first light from a third light source within the first light housing.

7. The light system of claim 1, wherein a surface area of the light guide where the light guide receives the first light is smaller than a surface area of the light guide where the light guide projects the first light.

8. The light system of claim 1, wherein a surface area of the light guide where the light guide receives the first light is larger than a surface area of the light guide where the light guide projects the first light.

9. The light system of claim 1, wherein the light guide is recessed within the gap.

10. The light system of claim 9, wherein a light redirecting material is positioned within the gap and configured to direct the first light out of the gap.

11. A light system of a vehicle, comprising:
    a first light housing including a light source;
    a second light housing;
    a gap located between the first light housing and the second light housing; and
    a light guide comprising a first surface configured to receive light from the light source and a second surface configured to project at least a portion of the light into the gap, wherein the first surface is within the first light housing and the second surface is within the gap and fills at least a portion of the gap.

12. The light system of claim 11, wherein a normal vector corresponding to the first surface extends noncollinearly with respect to a normal vector corresponding to the second surface.

13. The light system of claim 11, wherein the light guide comprises a diffusive layer configured to scatter the light.

14. The light system of claim 11, wherein:
    the second light housing is attached to a hinged portion of the vehicle rotatable between an open position and a closed position; and
    the light guide is impacted when rotating the hinged portion from the open position to the closed position.

15. The light system of claim 11, wherein a surface area of the light guide where the light guide receives light from the first light housing is smaller than a surface area of the light guide where the light guide projects light.

16. A light system of a vehicle, comprising:
    a first light housing including at least one light source configured to emit a first light from a first section of the first light housing and emit a second light from a second section of the first light housing;
    a second light housing including at least one light source configured to emit the first light from a first section of the second light housing and emit the second light from a second section of the second light housing;
    a gap located between the first light housing and the second light housing, wherein:
    a first section of the gap is positioned between the first section of the first light housing and the first section of the second light housing; and
    a second section of the gap is positioned between the second section of the first light housing and the second section of the second light housing; and a light guide within the gap configured to transmit light to illuminate the first section of the gap with the first light and the second section of the gap with the second light.

17. The light system of claim 16, wherein the light guide is configured to receive the first light from the at least one light source in the first light housing.

18. The light system of claim 16, wherein the light guide includes a light blocker configured to divide the light guide such that a first portion of the light guide is configured to transmit light to the first section of the gap and a second portion of the light guide is configured to transmit light to the second section of the gap.

19. The light system of claim 16, wherein the light guide comprises a first light guide configured to transmit light to the first section of the gap and a second light guide configured to transmit light to the second section of the gap.

20. The light system of claim 16, wherein the first light substantially matches the second light in at least one of color or brightness.

\* \* \* \* \*